United States Patent
Tsirkin

(10) Patent No.: US 9,774,540 B2
(45) Date of Patent: Sep. 26, 2017

(54) PACKET DROP BASED DYNAMIC RECEIVE PRIORITY FOR NETWORK DEVICES

(71) Applicant: Red Hat Israel, Ltd., Raanana (IL)

(72) Inventor: Michael Tsirkin, Yokeneam Yillit (IL)

(73) Assignee: Red Hat Israel, Ltd., Raanana (IL)

( * ) Notice: Subject to any disclaimer, the term of this patent is extended or adjusted under 35 U.S.C. 154(b) by 114 days.

(21) Appl. No.: 14/527,546

(22) Filed: Oct. 29, 2014

(65) Prior Publication Data
US 2016/0128077 A1 May 5, 2016

(51) Int. Cl.
*H04W 72/10* (2009.01)
*H04L 12/801* (2013.01)
*H04L 12/851* (2013.01)

(52) U.S. Cl.
CPC ............ *H04L 47/29* (2013.01); *H04L 47/24* (2013.01)

(58) Field of Classification Search
CPC ............................... H04L 47/29; H04L 47/24
See application file for complete search history.

(56) References Cited

U.S. PATENT DOCUMENTS

| | | | |
|---|---|---|---|
| 8,619,793 B2 | 12/2013 | Lavian et al. | |
| 2008/0117818 A1* | 5/2008 | Cox | H04L 47/10 370/231 |
| 2008/0279097 A1* | 11/2008 | Campion | H04L 47/10 370/229 |
| 2011/0238792 A1* | 9/2011 | Phillips | G06F 15/177 709/220 |
| 2011/0320617 A1* | 12/2011 | Annamalaisami | H04L 63/1458 709/228 |
| 2012/0324442 A1 | 12/2012 | Barde | |
| 2013/0024855 A1 | 1/2013 | North | |
| 2014/0056141 A1 | 2/2014 | Breternitz, Jr. et al. | |
| 2014/0101306 A1* | 4/2014 | Murgia | H04L 47/125 709/224 |
| 2014/0146677 A1 | 5/2014 | Howes et al. | |
| 2014/0181531 A1* | 6/2014 | Saha | G06F 21/602 713/189 |
| 2014/0241360 A1* | 8/2014 | Jackowski | H04L 69/32 370/392 |
| 2014/0301197 A1* | 10/2014 | Birke | H04L 47/52 370/235 |
| 2014/0376555 A1* | 12/2014 | Choi | H04L 49/70 370/395.53 |
| 2016/0026490 A1* | 1/2016 | Johnsson | H04L 43/0864 718/1 |

OTHER PUBLICATIONS

No Author, "Policing and Shaping Overview," Cisco IOS Quality of Service Solutions Configuration Guide, Retrieved from the Internet on Oct. 29, 2014, 16 pages, QC-207, World Wide Web, http://www.cisco.com/c/en/us/td/docs/ios/12_2/qos/configuration/guide/fqos_c/qcfpolsh.html.

No Author, "Quality of Service on the Cisco Catalyst 4500E Supervisor Engines," Cisco White Paper, Jun. 2013, 19 pages, C11-539588-03, World Wide Web, http://www.cisco.com/c/en/us/products/collateral/switches/catalyst-4500-series-switches/white_paper_c11-539588.html.

* cited by examiner

*Primary Examiner* — Phuc Tran
(74) *Attorney, Agent, or Firm* — Lowenstein Sandler LLP

(57) ABSTRACT

A hypervisor executed by a processing device retrieves a plurality of packets from a network device and forwards the packets to one or more virtual machines. The hypervisor determines a number of the plurality of packets successfully received by the one or more virtual machines, and when a function of the number is below a first threshold, decreases a priority for the network device associated with handling incoming packets.

20 Claims, 4 Drawing Sheets

PACKET DROP BASED DYNAMIC RECEIVE PRIORITY FOR NETWORK DEVICES

TECHNICAL FIELD

The present disclosure is generally related to computer systems, and more particularly, to network device management of computer systems.

BACKGROUND

A virtual machine (VM) is a portion of software that, when executed on appropriate hardware, creates an environment allowing the virtualization of an actual physical computer system (e.g., a server, a mainframe computer, etc.). The actual physical computer system is typically referred to as a "host machine," and the operating system of the host machine is typically referred to as the "host operating system." Typically, software on the host machine known as a "hypervisor" (or a "virtual machine monitor") manages the execution of one or more virtual machines or "guests", providing a variety of functions such as virtualizing and allocating resources, context switching among virtual machines, etc. The operating system of the virtual machine is typically referred to as the "guest operating system."

A virtual machine may comprise one or more "virtual devices," each of which maps to a "network device" of the host machine (e.g., a network interface device, a CD-ROM drive, etc.). One type of network device is a network interface controller (NIC, also known as a network interface card, network adapter, LAN adapter, and by similar terms) which contains the electronic circuitry required to communicate using a wired connection (e.g., Ethernet) or a wireless connection (e.g., WiFi).

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Figure 1:
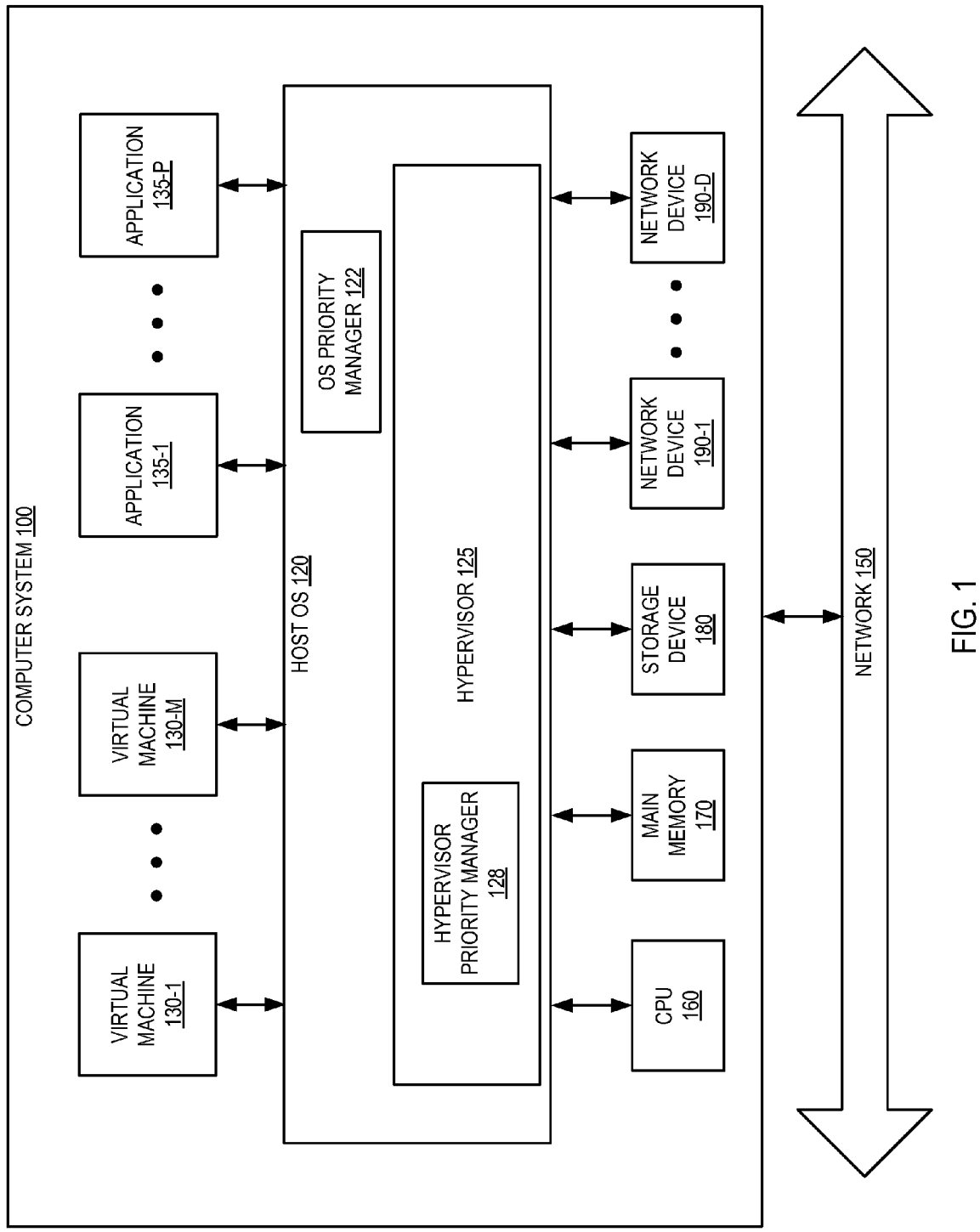
FIG. 1 depicts a high-level component diagram of an example computer system architecture, in accordance with one or more aspects of the present disclosure.

Described herein are methods and systems for dynamically adjusting a priority of a network device.

One type of network device is a network interface controller (NIC, also known as a network interface card, network adapter, LAN adapter, and by similar terms) which contains the electronic circuitry required to communicate using a wired connection (e.g., Ethernet) or a wireless connection (e.g., WiFi). Networked computers communicate with each other using a particular protocol or agreed-upon language for transmitting data packets between the different machines or "nodes." The NIC acts as an interpreter, allowing the machine to both send and receive data on a LAN.

Data packets arrive at the NIC and are forwarded by the hypervisor of a virtualized computer system or by an operating system (OS) to virtual machines (VMs) or applications respectively. If the VMs or applications are not consuming the packets at a fast enough rate, then the packets can be discarded by the hypervisor or OS. The faster the NIC, the greater the possibility that large numbers of packets may be discarded. The receive queue for a network device has a parameter that controls its priority (or "weight") that can specify how many packets can be processed by the hypervisor or OS for that device within a period of time. A priority that is set too high can result in a large number of packets being dropped by the hypervisor.

Aspects of the present disclosure address the above noted deficiency by dynamically adjusting the priority of network devices in view of the success rate of routing packets without dropping them. In some implementations, aspects of the present disclosure may be applied in a virtualized environment, or alternatively, in a non-virtualized environment. In an illustrative example, a hypervisor retrieves a plurality of packets received by a network device, and then forwards the packets to one or more VMs. In some implementations, the network device may be a network interface card (NIC). Alternatively, the network device may be a virtual device. The packets may be stored by the networking device in a memory space dedicated to the device. Alternatively, the packets may be stored in the physical memory (RAM) of the computer system. The hypervisor may receive an interrupt from the network device, retrieve the packets from the network device, and then locate the target VM for the packets based, for example, on information contained in the packets. The hypervisor can then forward the packets to the intended destination. In some implementations, each packet may be forwarded to multiple VMs. Alternatively, each packet may be forwarded to a different VM.

The hypervisor may forward a number of packets based on the predetermined priority parameter assigned to the receive queue of the device. The priority can specify the number of packets that can be processed by the hypervisor for a particular network device within a period of time. For example, the predetermined priority may be a Linux New Application Programming Interface (NAPI) weight for the network device, which limits the number of packets a device can feed to the networking core during each polling cycle. Decreasing the priority can lower the number of packets that will be processed by the hypervisor within a period of time, giving a VM the chance to empty a full queue. Additionally, it can free the hypervisor to service other devices and applications that are more responsive. Alternatively, the priority can specify the number of packets that can be processed by the hypervisor for a particular network device before executing a hypervisor task. A hypervisor task may include executing a virtual machine, receiving packets from a NIC, transmitting packets to an NIC, or the like. In certain implementations, the hypervisor may forward a packet by copying the packet from one memory location to another memory location that is accessible to the VM. For example, the hypervisor may copy the packet data from a memory location dedicated to the network device directly to memory location of the queue of the virtual NIC. A virtual NIC is the virtualized representation of the physical NIC within the VM. Alternatively, the hypervisor may forward a pointer to the VM that can provide the VM with an address to a location in memory that is shared between the VM and the hypervisor.

When the hypervisor prepares to forward the packets to the virtual NIC of the VM, it may check to see if there is sufficient memory available to do so. In certain implementations, there may be predefined limits on the available hypervisor memory, guest memory, or shared memory spaces that control the receive queues for the virtual NICs for the VMs. For example, the receive queues could be limited by a particular number of bytes, a number of packets, or any other method. If the receive queue for the device in the destination VM is full (e.g., there is insufficient available memory), the hypervisor may not be able to add new packets until processing of the existing packets by the VM frees space on the device receive queue. In this situation, the hypervisor may "drop" the packet without forwarding it to its intended destination.

In certain implementations, the hypervisor may keep track of whether a packet was dropped or successfully forwarded to a VM in order to accumulate transmission history. In one illustrative example, the hypervisor can keep track of a predetermined number of packets to keep a rolling total of successfully forwarded packets. For example, the hypervisor can save the status of the last 64 packets retrieved from a device. The hypervisor may store this information in memory, or alternatively, save it to data storage for later use.

Subsequently, the hypervisor may determine a number of the plurality of packets successfully received by the one or more VMs. In one illustrative example, the hypervisor may make this determination each time a packet is retrieved from a network device. This can provide a more granular assessment of the success rate, since the determination can be made for each packet processed. Alternatively, the hypervisor may make this determination periodically based on an interval timer. The hypervisor may determine the success rate in view of the number of packets successfully processed, a percentage of packets successfully processed out of the total number of packets processed, or by any other method.

When a function of the number of packets successfully received by the VM is less than a first threshold, the hypervisor may decrease a priority for the network device associated with handling incoming data packets. The function of the number may be the total number of successfully forwarded packets, the percentage success rate, a heuristic implemented based on historical statistics, or the like. The first threshold can be set to determine the minimum number of successfully forwarded packets that must be processed in order to avoid decreasing the device priority. For example, the threshold can be set such that a single dropped packet will result in the hypervisor lowering the priority for the network device in order to avoid dropping future packets. Alternatively, the threshold can be set such that the priority will not be decreased without several dropped packets within a period of time.

In certain implementations, when the function of the number of packets successfully received by the VM is greater than the first threshold, the hypervisor may increase the priority for the network device associated with handling incoming data packets. In this instance, a single working VM that receives packets successfully without the hypervisor having to drop packets will prevent the priority from being decreased. Thus, no number of lagging VMs can result in the hypervisor increasing the latency for a VM that is processing efficiently.

In some implementations, when the function of the number of packets successfully received by the VM is greater than a second threshold, which in turn is greater than the first threshold, the hypervisor may increase the priority for the network device associated with handling incoming data packets. The second threshold can be set to determine the number of successfully forwarded packets that must be processed in order to increase the device priority. For example, the second threshold can be set such that the previous N packets must all have been processed successfully before the priority of the device may be increased, where N is a predetermined positive integer.

In another illustrative example, aspects of the present disclosure may be applied to a non-virtualized environment, where an OS may perform the above noted functionality attributed to a hypervisor and an application may perform the above noted functionality attributed to a VM.

Aspects of the present disclosure are thus capable of dynamically adjusting the priority of network devices. More particularly, aspects of the present disclosure can throttle the latency of packet processing to reduce the number of dropped packets by adjusting the priority of network devices based on measured success rates in routing packets without dropping them.

FIG. 1 depicts a high-level component diagram of an illustrative example of a computer system 100, in accordance with one or more aspects of the present disclosure. One skilled in the art will appreciate that other architectures for computer system 100 are possible, and that the implementation of a computer system utilizing examples of the invention are not necessarily limited to the specific architecture depicted by FIG. 1.

As shown in FIG. 1, the computer system 100 is connected to a network 150 and comprises one or more central processing units (CPU) 160, main memory 170, which may include volatile memory devices (e.g., random access memory (RAM)), non-volatile memory devices (e.g., flash memory) and/or other types of memory devices, a storage device 180 (e.g., one or more magnetic hard disk drives, a Universal Serial Bus [USB] solid state drive, a Redundant Array of Independent Disks [RAID] system, a network attached storage [NAS] array, etc.), and one or more network devices 190-1 through 190-D, where D is a positive integer (e.g., a network interface controller (NIC), an I/O device, a CD/DVD-ROM drive, etc.). In certain implementations, main memory 170 may be non-uniform access (NUMA), such that memory access time depends on the memory location relative to CPU 160.

The computer system 100 may be a server, a mainframe, a workstation, a personal computer (PC), a mobile phone, a palm-sized computing device, etc. The network 150 may be a private network (e.g., a local area network (LAN), a wide area network (WAN), intranet, etc.) or a public network (e.g., the Internet).

It should be noted that although, for simplicity, a single CPU is depicted in FIG. 1, in some other embodiments computer system 100 may comprise a plurality of CPUs. Similarly, in some other embodiments computer system 100 may comprise a plurality of storage devices 180, rather than a single storage device 180.

Computer system 100 may additionally comprise one or more virtual machines (VMs) 130-1 through 130-M, where M is a positive integer, one or more applications 135-1 through 135-P, where P is a positive integer, and host operating system (OS) 120. VMs 130 are a software implementation of a machine that executes programs as though it were an actual physical machine. Host OS 120 manages the hardware resources of the computer system and provides functions such as inter-process communication, scheduling, memory management, and so forth. Applications 135-1 through 135-P are software applications running on the same CPU.

Host OS 120 may comprise a hypervisor 125, which provides a virtual operating platform for VMs 130 and manages their execution. Host OS 120 may also comprise an OS priority manager 122 that can dynamically adjust a priority for a network device. Hypervisor 125 may comprise hypervisor priority manager 128 that can dynamically adjust a priority for a network device. It should be noted that in some alternative implementations, hypervisor 125 may be external to host OS 120, rather than embedded within host OS 120, or may replace host OS 120.

Hypervisor priority manager 128 can dynamically adjusts a priority for a network device by the hypervisor for packets directed to VMs, as described in detail below with respect to FIG. 2. OS priority manager 122 can dynamically adjusts a priority for a network device by the OS for packets directed to applications on the same CPU, as described in detail below with respect to FIG. 3.

Figure 2:
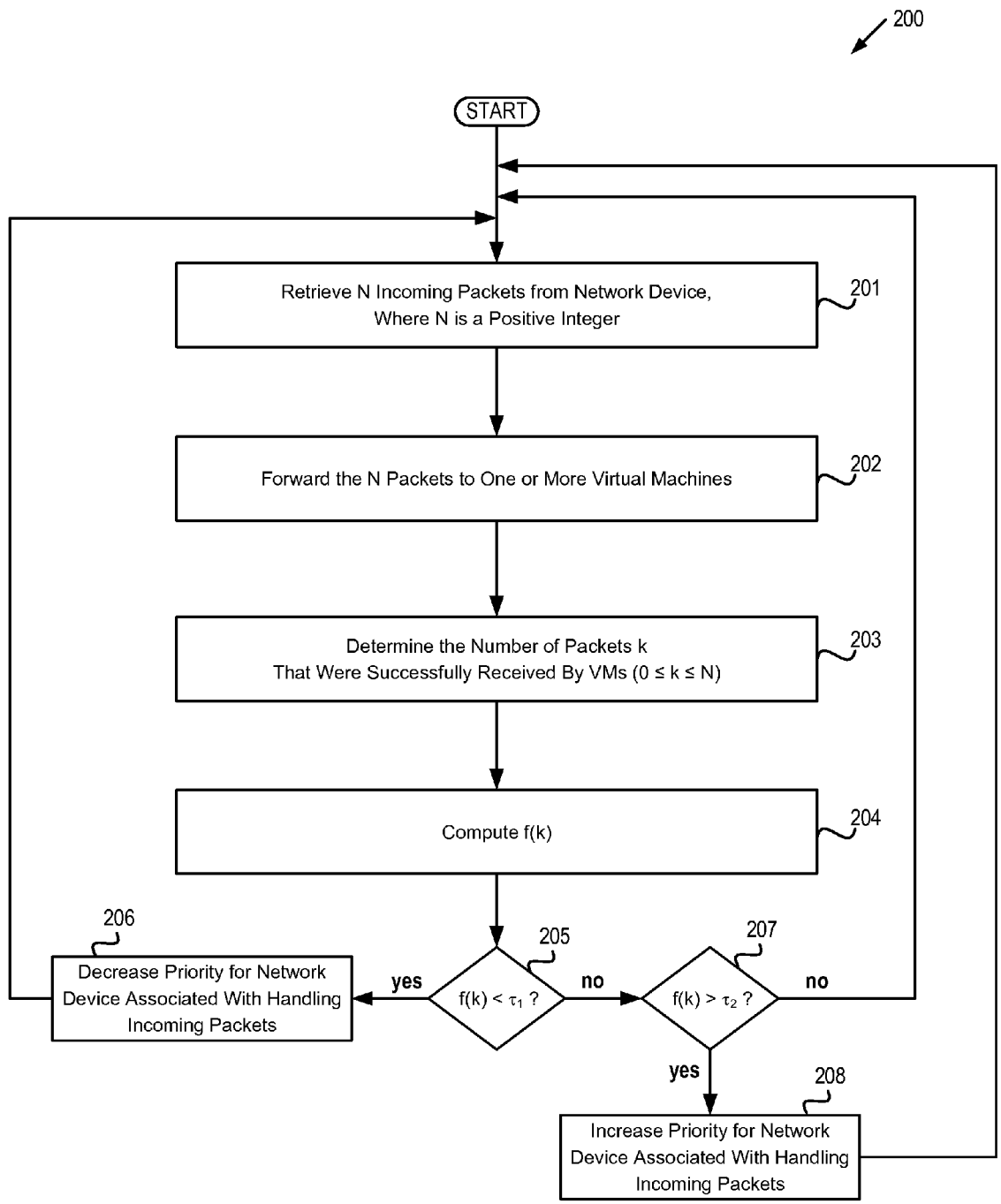
FIG. 2 depicts a flow diagram of one example of a method by which a hypervisor dynamically adjusts a priority for a network device.

FIG. 2 depicts a flow diagram of an example method 200 by which a hypervisor dynamically adjusts a priority for a network device. The method may be performed by processing logic that may comprise hardware (circuitry, dedicated logic, etc.), software (such as is run on a general purpose computer system or a dedicated machine), or a combination of both. In one illustrative example, method 200 may be performed by hypervisor priority manager 128 of hypervisor 125 in FIG. 1. Alternatively, some or all of method 200 might be performed by another machine. It should be noted that blocks depicted in FIG. 2 could be performed simultaneously or in a different order than that depicted.

At block 201, processing logic retrieves a plurality of packets from a network device. In one illustrative example, processing logic retrieves N packets, where N is a positive integer. The network device may be a network interface card (NIC), or alternatively, a virtual device. The packets may be stored by the networking device in a memory space dedicated to the device, in the physical memory (RAM) of the computer system, or in any other manner. Processing logic may receive an interrupt from the network device, retrieve the packets from the network device, and then locate the target VM for the packets based, for example, on information contained in the packets.

At block 202, processing logic forwards the packets to one or more VMs. In some implementations, each packet may be forwarded to multiple VMs. Alternatively, each packet may be forwarded to a different VM. Processing logic may forward a number of packets based on the predetermined priority parameter assigned to the receive queue of the device. The priority can specify the number of packets that can be processed by the hypervisor for a particular network device within a period of time. For example, the predetermined priority may be a Linux New Application Programming Interface (NAPI) weight for the network device, which limits the number of packets a device can feed to the networking core during each polling cycle. Alternatively, the priority can specify the number of packets that can be processed by the hypervisor for a particular network device before executing a hypervisor task. A hypervisor task may include executing a virtual machine, receiving packets from a NIC, transmitting packets to an NIC, or the like.

In certain implementations, processing logic may forward a packet by copying the packet from one memory location to another memory location that is accessible to a VM. For example, the hypervisor may copy the packet data from a memory location dedicated to the network device directly to memory location of the queue of the virtual NIC. Alternatively, the hypervisor may forward a pointer to the VM that can provide the VM with an address to a location in memory that is shared between the VM and the hypervisor.

At block 203, processing logic determines the number of packets that were successfully received by the VMs. In some implementations, the number of packets successfully received by the VMs can be represented as k, where k is greater than or equal to zero and less than or equal to N. In one illustrative example, processing logic may make this determination each time a packet is retrieved from a network device. This can provide a more granular assessment of the success rate, since the determination can be made for each packet processed. Alternatively, processing logic may make this determination periodically based on an interval timer. Processing logic may determine the success rate in view of the number of packets successfully processed, a percentage of packets successfully processed out of the total number of packets processed, or by any other method.

At block 204, processing logic computes a function of the determined number from block 203. The function of the number may be the total number of successfully forwarded packets within a period of time, the number of dropped packets, the percentage success rate, a heuristic implemented based on historical statistics, or the like.

At block 205, processing logic determines whether the function computed at block 204 is less than a first threshold. If so, processing logic continues to block 206, otherwise processing logic proceeds to block 207. The first threshold can be set to determine the minimum number of successfully forwarded packets that must be processed in order to avoid decreasing the device priority. For example, the threshold can be set such that a single dropped packet will result in processing logic lowering the priority for the network device in order to avoid dropping future packets. Alternatively, the threshold can be set such that the priority will not be decreased without several dropped packets within a period of time.

At block 206, processing logic may decrease the priority for the network device associated with handling the incoming packets retrieved at block 201. After block 206, processing logic may return to block 201 to retrieve additional packets.

At block 207, processing logic determines whether the function computed at block 204 is greater than a second threshold. If so, processing logic continues to block 208, otherwise processing logic returns to block 201 to retrieve additional packets. The second threshold can be set to determine the number of successfully forwarded packets that must be processed in order to increase the device priority. For example, the second threshold can be set such that the previous N packets must all have been processed successfully before the priority of the device may be increased. Alternatively, the second threshold can be set such that it is equal to the first threshold. In this instance, a single working VM that receives packets successfully without the hypervisor having to drop packets will prevent the priority from being decreased. Thus, no number of lagging VMs can result in the hypervisor increasing the latency for a VM that is processing efficiently.

At block 208, processing logic may increase the priority for the network device associated with handling incoming data packets. After block 208, processing logic processing logic may return to block 201 to retrieve additional packets.

Figure 3:
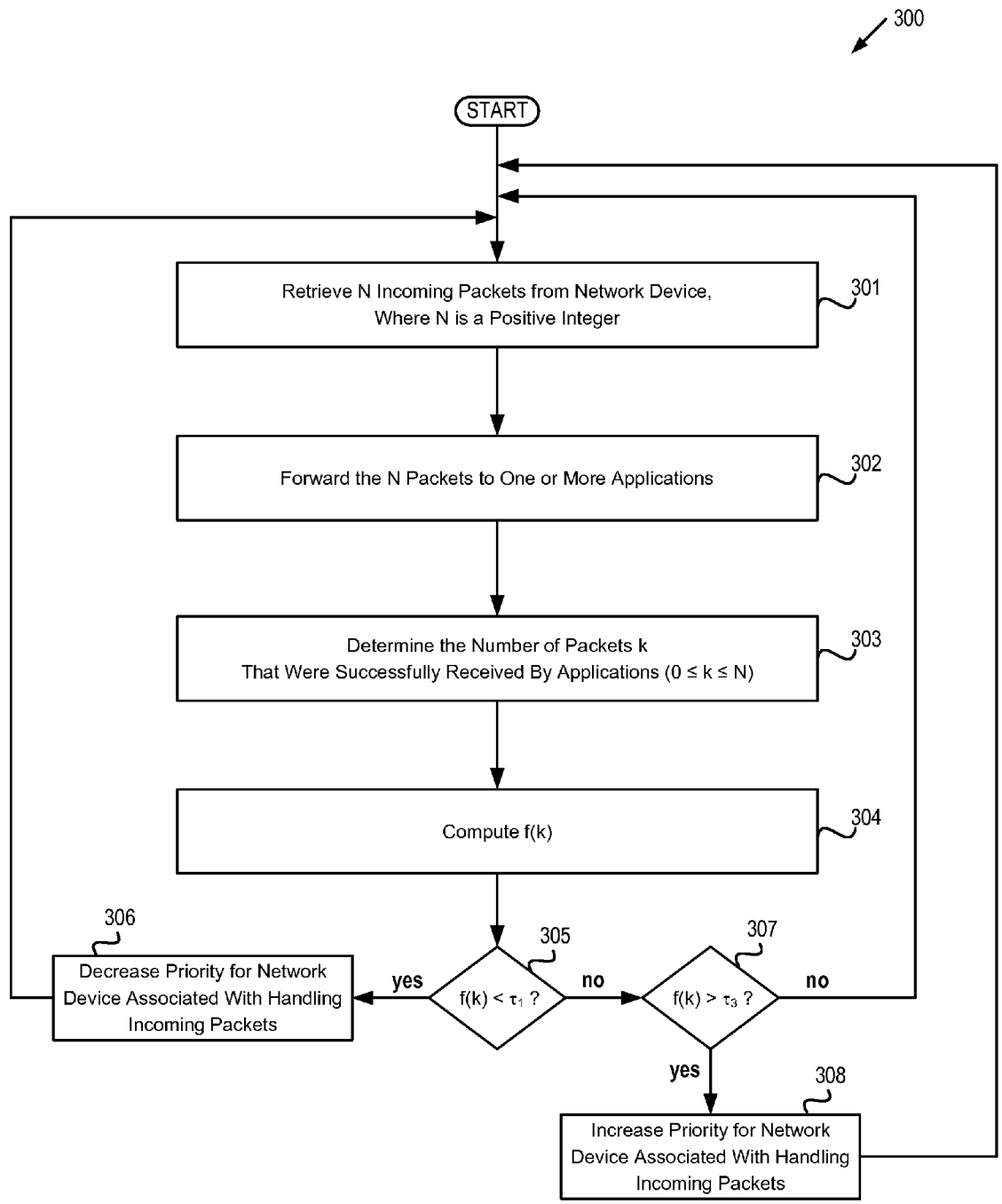
FIG. 3 depicts a flow diagram of one example of a method by which an operating system dynamically adjusts a priority for a network device.

FIG. 3 depicts a flow diagram of an example method 300 by which an operating system dynamically adjusts a priority for a network device. The method may be performed by processing logic that may comprise hardware (circuitry, dedicated logic, etc.), software (such as is run on a general purpose computer system or a dedicated machine), or a combination of both. In one illustrative example, method 300 may be performed by OS priority manager 122 of Host OS 120 in FIG. 1. Alternatively, some or all of method 300 might be performed by another machine. It should be noted that blocks depicted in FIG. 3 could be performed simultaneously or in a different order than that depicted.

At block 301, processing logic retrieves a plurality of packets from a network device. In one illustrative example, processing logic retrieves N packets, where N is a positive integer. The network device may be a network interface card (NIC), or alternatively, a virtual device. The packets may be stored by the networking device in a memory space dedicated to the device, in the physical memory (RAM) of the computer system, or in any other manner. Processing logic may receive an interrupt from the network device, retrieve the packets from the network device, and then locate the target application for the packets based, for example, on information contained in the packets.

At block 302, processing logic forwards the packets to one or more applications, such as those represented by applications 135-1 through 135-P of FIG. 1. In some implementations, each packet may be forwarded to multiple applications. Alternatively, each packet may be forwarded to a different application. Processing logic may forward a number of packets based on the predetermined priority parameter assigned to the receive queue of the device. The priority can specify the number of packets that will be processed by the hypervisor for a particular network device within a period of time. For example, the predetermined priority may be a Linux New Application Programming Interface (NAPI) weight for the network device, which limits the number of packets a device can feed to the networking core during each polling cycle. Alternatively, the priority can specify the number of packets that can be processed by the hypervisor for a particular network device before executing a hypervisor task. A hypervisor task may include executing a virtual machine, receiving packets from a NIC, transmitting packets to an NIC, or the like.

In certain implementations, processing logic may forward a packet by copying the packet from one memory location to another memory location that is accessible to an application. For example, the OS may copy the packet data from a memory location dedicated to the network device directly to memory location of the application's receive queue. Alternatively, the OS may forward a pointer to the application that can provide the application with an address to a location in memory that is shared between the application and the OS.

At block 303, processing logic determines the number of packets that were successfully received by the applications. In some implementations, the number of packets successfully received by the applications can be represented as k, where k is greater than or equal to zero and less than or equal to N. In one illustrative example, processing logic may make this determination each time a packet is retrieved from a network device. This can provide a more granular assessment of the success rate, since the determination can be made for each packet processed. Alternatively, processing logic may make this determination periodically based on an interval timer. Processing logic may determine the success rate in view of the number of packets successfully processed, a percentage of packets successfully processed out of the total number of packets processed, or by any other method.

At block 304, processing logic computes a function of the determined number from block 303. The function of the number may be the total number of successfully forwarded packets, the percentage success rate, a heuristic implemented based on historical statistics, or the like.

At block 305, processing logic determines whether the function computed at block 304 is less than a first threshold. If so, processing logic continues to block 306, otherwise processing logic proceeds to block 307. The first threshold can be set to determine the minimum number of successfully forwarded packets that must be processed in order to avoid decreasing the device priority. For example, the threshold can be set such that a single dropped packet will result in processing logic lowering the priority for the network device in order to avoid dropping future packets. Alternatively, the threshold can be set such that the priority will not be decreased without several dropped packets within a period of time.

At block 306, processing logic may decrease the priority for the network device associated with handling the incoming packets retrieved at block 301. After block 306, processing logic may return to block 301 to retrieve additional packets.

At block 307, processing logic determines whether the function computed at block 304 is greater than a second threshold. If so, processing logic continues to block 308, otherwise processing logic returns to block 301 to retrieve additional packets. The second threshold can be set to determine the number of successfully forwarded packets that must be processed in order to increase the device priority. For example, the second threshold can be set such that the previous N packets must all have been processed successfully before the priority of the device may be increased. Alternatively, the second threshold can be set such that it is equal to the first threshold. In this instance, a single working application that receives packets successfully without the OS having to drop packets will prevent the priority from being decreased. Thus, no number of lagging applications can result in the OS increasing the latency for an application that is processing efficiently.

At block 308, processing logic may increase the priority for the network device associated with handling incoming data packets. After block 308, processing logic processing logic may return to block 301 to retrieve additional packets.

Figure 4:
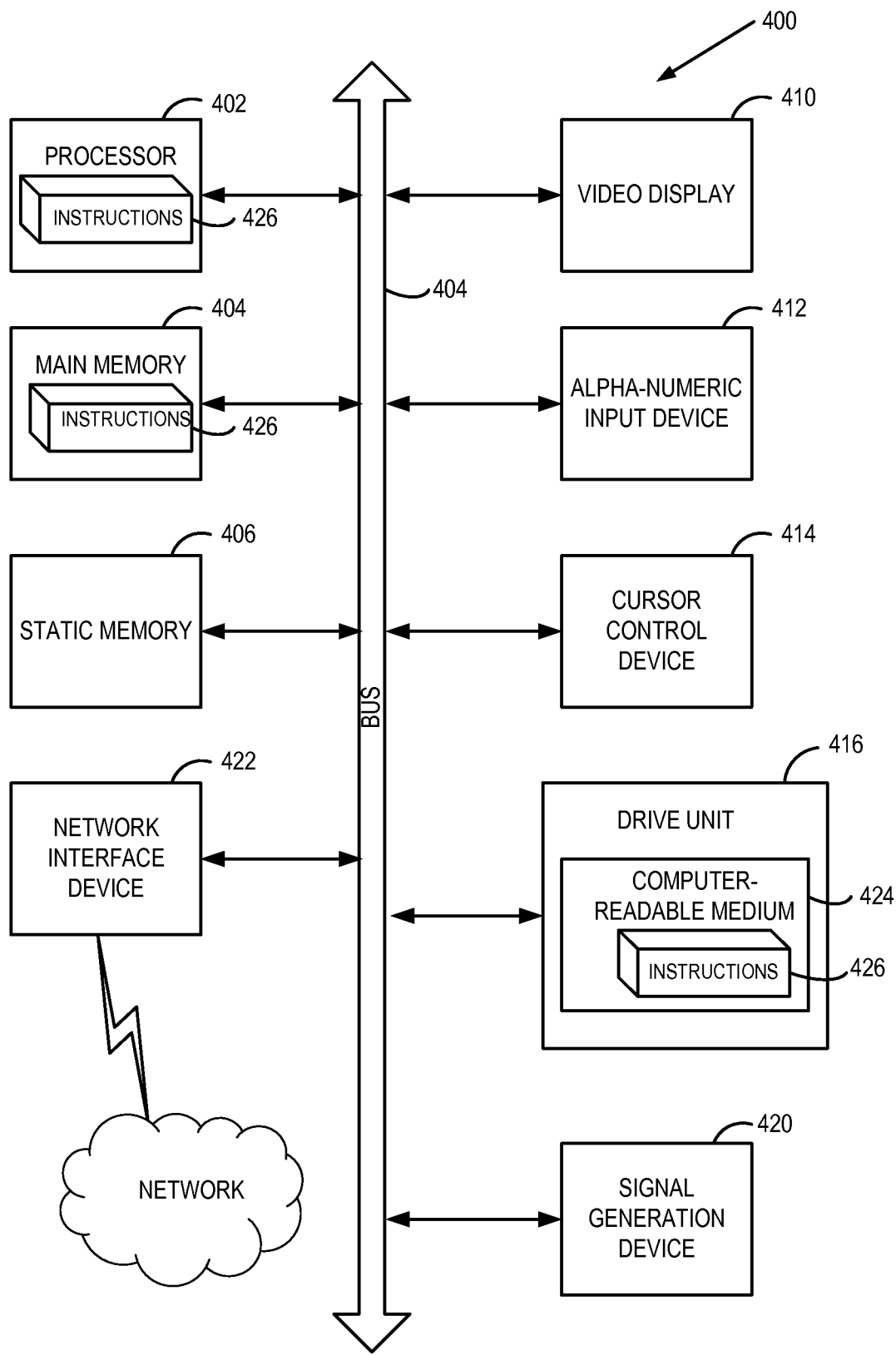
FIG. 4 depicts a block diagram of an illustrative computer system operating in accordance with examples of the invention.

FIG. 4 depicts an example computer system 400 which can perform any one or more of the methods described herein. In one example, computer system 400 may correspond to computer system 100 of FIG. 1. The computer system may be connected (e.g., networked) to other computer systems in a LAN, an intranet, an extranet, or the Internet. The computer system may operate in the capacity of a server in a client-server network environment. The computer system may be a personal computer (PC), a set-top box (STB), a server, a network router, switch or bridge, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 400 includes a processing system (processor) 402, a main memory 404 (e.g., read-only memory (ROM), flash memory, dynamic random access memory (DRAM) such as synchronous DRAM (SDRAM)), a static memory 406 (e.g., flash memory, static random access memory (SRAM)), and a data storage device 416, which communicate with each other via a bus 408.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute instructions 426 for performing the operations and steps discussed herein.

The computer system 400 may further include a network interface device 422. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The data storage device 416 may include a computer-readable medium 424 on which is stored one or more sets of instructions 426 (e.g., instructions corresponding to the methods of FIGS. 2 and 3, etc.) embodying any one or more of the methodologies or functions described herein. Instructions 426 may also reside, completely or at least partially, within the main memory 404 and/or within the processor 402 during execution thereof by the computer system 400, the main memory 404 and the processor 402 also constituting computer-readable media. Instructions 426 may further be transmitted or received over a network via the network interface device 422.

While the computer-readable storage medium 424 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the invention should, therefore, be determined with reference to the appended claims, along with the full scope of equivalents to which such claims are entitled.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "determining", "allocating", "notifying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

What is claimed is:

1. A method comprising:
retrieving, by a processing device executing a hypervisor, a plurality of packets received by a network device;
forwarding, to one or more virtual machines, the plurality of packets received by the network device;
determining, by the processing device executing the hypervisor, a number of the plurality of packets successfully received by the one or more virtual machines, wherein the number of the plurality of packets successfully received comprises a quantity of the packets successfully received; and
responsive to determining that a function of the number of the plurality of packets successfully received is less than a first threshold, decreasing a priority for the network device associated with handling incoming packets, wherein the priority specifies a number of packets that can be processed by the hypervisor for the network device, and wherein decreasing the priority comprises lowering the number of packets that can be processed by the hypervisor for the network device.

2. The method of claim 1 further comprising increasing the priority responsive to determining that the function of the number is greater than a second threshold that is greater than the first threshold.

3. The method of claim 1 further comprising increasing the priority responsive to determining that the function of the number is greater than the first threshold.

4. The method of claim 1 wherein each of the plurality of packets is forwarded to a respective one of the one or more virtual machines.

5. The method of claim 1 wherein the priority is a Linux New Application Programming Interface (NAPI) weight for the network device.

6. The method of claim 1 wherein the priority specifies at least one of the number of packets that can be processed by the hypervisor for a particular network device within a period of time, or the number of packets that can be processed by the hypervisor for a particular network device before executing a hypervisor task.

7. The method of claim 1 wherein the function of the number comprises at least one of a total number of successfully forwarded packets within a period of time, a number of dropped packets, a percentage success rate, or a heuristic implemented based on historical statistics.

8. A computing apparatus comprising:
a memory; and
a processing device, operatively coupled to the memory, to execute a hypervisor to:
retrieve a plurality of packets received by a network device;
forward to one or more virtual machines the plurality of packets received by the network device;
determine a number of the plurality of packets successfully received by the one or more virtual machines, wherein the number of the plurality of packets successfully received comprises a quantity of the packets successfully received; and
responsive to determining that a function of the number of the plurality of packets successfully received is greater than a first threshold, increase a priority for the network device associated with handling incoming packets, wherein the priority specifies a number of packets that can be processed by the hypervisor for the network device, and wherein decreasing the priority comprises lowering the number of packets that can be processed by the hypervisor for the network device.

9. The apparatus of claim 8 wherein the processing device is further to decrease the priority responsive to determining that the function of the number is less than a second threshold that is less than the first threshold.

10. The apparatus of claim 8 wherein the processing device is further to decrease the priority responsive to determining that the function of the number is less than the first threshold.

11. The apparatus of claim 8 wherein each of the plurality of packets is forwarded to a respective one of the one or more virtual machines.

12. The apparatus of claim 8 wherein the priority is a Linux NAPI weight for the network device.

13. The apparatus of claim 8 wherein the priority specifies at least one of the number of packets that can be processed by the hypervisor for a particular network device within a period of time, or the number of packets that can be processed by the hypervisor for a particular network device before executing a hypervisor task.

14. The apparatus of claim 8 wherein the function of the number comprises at least one of a total number of successfully forwarded packets within a period of time, a number of dropped packets, a percentage success rate, or a heuristic implemented based on historical statistics.

15. A non-transitory computer readable storage medium, having instructions stored therein, which when executed by a processing device of a computer system, cause the processing device to:
retrieve, by the processing device executing an operating system, a plurality of packets received by a network device;
forward, to one or more applications, the plurality of packets received by the network device;
determine, by the processing device executing the operating system, a number of the plurality of packets successfully received by the one or more applications, wherein the number of the plurality of packets successfully received comprises a quantity of the packets successfully received; and
responsive to determining that a function of the number of the plurality of packets successfully received is less than a first threshold, decrease a priority for the network device associated with handling incoming packets, wherein the priority specifies a number of packets that can be processed by the hypervisor for the network device, and wherein decreasing the priority comprises lowering the number of packets that can be processed by the hypervisor for the network device.

16. The non-transitory computer readable storage medium of claim 15 wherein the processing device is further to increase the priority responsive to determining that the function of the number is greater than a second threshold that is greater than the first threshold.

17. The non-transitory computer readable storage medium of claim 15 wherein the processing device is further to increase the priority responsive to determining that the function of the number is greater than the first threshold.

18. The non-transitory computer readable storage medium of claim 15 wherein each of the plurality of packets is forwarded to a respective one of the one or more applications.

19. The non-transitory computer readable storage medium of claim 15 wherein the priority specifies at least one of the number of packets that can be processed by the operating system for a particular network device within a period of time, or the number of packets that can be processed by the operating system for a particular network device before executing an operating system task.

20. The non-transitory computer readable storage medium of claim 15 wherein the function of the number comprises at least one of a total number of successfully forwarded packets within a period of time, a number of dropped packets, a percentage success rate, or a heuristic implemented based on historical statistics.

* * * * *